United States Patent [19]

Avera

[11] 3,868,112

[45] Feb. 25, 1975

[54] ELECTRICAL GAME

[75] Inventor: Charles W. Avera, Winston-Salem, N.C.

[73] Assignee: Electronic Data Controls Corp., Winston-Salem, N.C.

[22] Filed: Feb. 4, 1971

[21] Appl. No.: 112,545

Related U.S. Application Data

[63] Continuation-in-part of Ser. No. 755,052, Aug. 26, 1968, abandoned, and a continuation-in-part of Ser. No. 789,806, Jan. 8, 1969, abandoned.

[52] U.S. Cl. ................ 273/94 R, 273/85 R, 273/88
[51] Int. Cl. ............................................ A63f 9/00
[58] Field of Search ................ 273/88 R, 94 R, 1 E; 74/25, 89.2

[56] References Cited
UNITED STATES PATENTS

| | | | |
|---|---|---|---|
| 2,029,834 | 2/1936 | Prentice | 273/94 R |
| 2,149,325 | 3/1939 | White | 273/94 R UX |
| 2,441,092 | 5/1948 | Weathers | 74/25 |
| 2,665,910 | 1/1954 | Hutchins | 273/88 |
| 2,780,461 | 2/1957 | Ryan | 273/94 R |
| 3,152,805 | 10/1964 | McGinn | 273/1 E X |
| 3,556,525 | 1/1971 | Pegg | 273/94 R |
| 3,563,547 | 2/1971 | Marsh | 273/94 R |
| 3,702,190 | 11/1972 | Waldrop | 273/94 R |

OTHER PUBLICATIONS

Wards Christmas Catalog, 1969, p. 394, "Computer Games" Football.

*Primary Examiner*—Paul E. Shapiro
*Attorney, Agent, or Firm*—Cushman, Darby and Cushman

[57] ABSTRACT

An electrical game having a board including a representation of an athletic field adjacent to a grid which represents the results of a plurality of athletic plays and which includes a first coordinate representing said plurality of athletic plays and a second coordinate having a plurality of indicator number. A light bar having a plurality of bulbs mounted thereon may be movably oriented or fixed with respect to said grid and may be selectively coupled in circuit relationship with offensive and defensive play result selection switches, the activation of which determines which of the bulbs is illuminated. In the fixed bar embodiment, by first selecting one of said plurality of athletic plays in said first coordinate and by activating one offensive and one defensive play result selection switch, one of the indicator numbers is selected so that the result of the athletic play can be determined by reading the grid at the coodinates as determined by the play selection and the selection of one of said indicator numbers. In the movable bar embodiment the light bar is mounted beneath the grid and may have an indicator which is viewable from the side of the game and can be aligned with the selected play. The bar is mounted on a pair of paralled guide rods. One rod is rotatable and has knobs fixed at its opposite ends. A cord is connected by its opposite ends on opposite sides of the bar and is looped around the knobs so that rotation of either knob will cause the bar to move along the rods.

8 Claims, 12 Drawing Figures

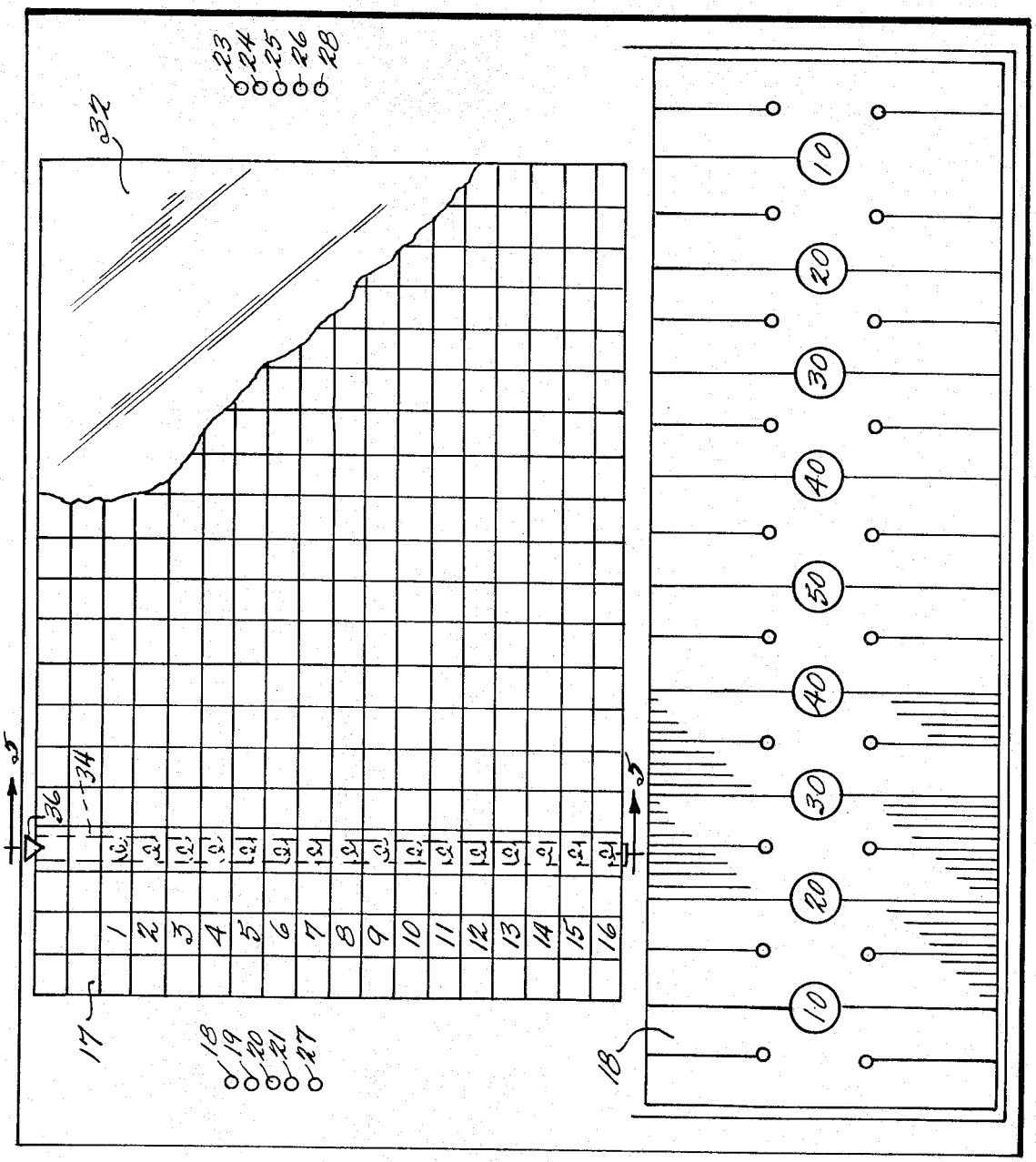

Fig. 2

| | KICK OFF | KICK OFF RE- TURN | OFF TACKLE | Q BACK SNEAK | FULL BACK CENTER | DRAW PLAY | OFF GUARD | AROUND END | SCREEN PASS | LONG PASS | SHORT PASS | INTER- CEPTION RUN BACK | PUNT | PUNT RE- TURN | FIELD GOAL | FUM- BLE | EXTRA POINTS | |
|---|---|---|---|---|---|---|---|---|---|---|---|---|---|---|---|---|---|---|
| 1 | 55 | 18 | -2 | -1 | 2 | -3 | 2 | 8 | 3 INTER-CEPT | INCOM-PLETE | 3 | 13 | 55 | 18 | 20 | LOST | GOOD | 1 |
| 2 | 33 | 4 | 4 | 2 | -3 | 2 | 2 FUMB | -1 | INCOM-PLETE | 21 | INCOM-PLETE | 7 | 36 | 1 | 33 | NO RECOV. | GOOD | 2 |
| 3 | 49 | 28 | 5 | 16 | 1 | 5 | 3 | 2 | 5 | INCOM-PLETE | 7 | 5 | 33 | -2 | 18 | LOST | GOOD | 3 |
| 4 | 43 | 16 | 0 | 0 | 5 | -3 | 2 | 0 | INCOM-PLETE | 15 INCOM-PLETE | 15 INTER-CEPT | 2 | 40 | 5 | RECOV. | GOOD | 4 |
| 5 | 30 | 2 | 2 | 2 | 2 | 1 | -3 | 5 | 4 | INCOM-PLETE | 5 | 5 | 28 | 2 | 25 | RECOV. | GOOD | 5 |
| 6 | 57 | 17 | -2 | 0 | 3 | 1 | 20 | 6 | -1 | INCOM-PLETE | INCOM-PLETE | FUMBLE | 33 | -3 | 17 | LOST | GOOD | 6 |
| 7 | 34 | 3 | 1 | 1 | 5 | 2 | 4 | -1 | -2 | INCOM-PLETE | 4 | T.D. | 18 | 4 | 14 | RECOV. | GOOD | 7 |
| 8 | 57 | 14 | 4 | 1 | 1 | 0 | 0 | 16 | 6 | 40 | INCOM-PLETE | FUMBLE | 45 | 6 | 35 | LOST | NO GOOD | 8 |
| 9 | | 35 | 3 | 4 | 0 | 1 | 16 | 0 | 2 | 30 INTER-CEPT | 3 | 5 | 3 | -2 | 30 | LOST | NO GOOD | 9 |
| 10 | 38 | 12 | 2 | -1 | 2 | 3 | 1 | -4 | 12 | 20 INTER-CEPT | 17 | 15 | 28 | 11 | 35 | RECOV. | GOOD | 10 |
| 11 | 45 | 8 | 2 | | 1 | -3 | 6 | 20 | INCOM-PLETE | T.D. | INTER-CEPT | 0 | 17 | 6 | BLOCKED | LOST | GOOD | 11 |
| 12 | 43 | 20 | -3 | 3 | 1 | 2 | -5 | -3 | INCOM-PLETE | 25 INTER-CEPT | 2 | 1 | 19 | -4 | 28 | RECOV. | GOOD | 12 |
| 13 | 40 | 3 | 4 | -2 | 2 | 5 | 0 | 2 | 4 INTER-CEPT | 31 | 4 | 8 | BLOCKED | 8 | 14 | LOST | GOOD | 13 |
| 14 | 52 | 37 | 1 | 4 | 5 | 1 | 2 | 3 | 5 | INCOM-PLETE | 5 | 5 | 38 | 4 | 21 | RECOV. | GOOD | 14 |
| 15 | 50 | 18 | -1 | 2 | 2 | -3 | -1 | FUMBLE | 6 | INCOM-PLETE | INCOM-PLETE | -2 | 24 | -1 | 31 | LOST | NO GOOD | 15 |
| 16 | 57 | 11 | 9 | 2 | 3 | 2 | 8 | -2 | 7 INTER-CEPT | INCOM-PLETE | 18 | 4 | 45 | 17 | 24 | RECOV. | GOOD | 16 |

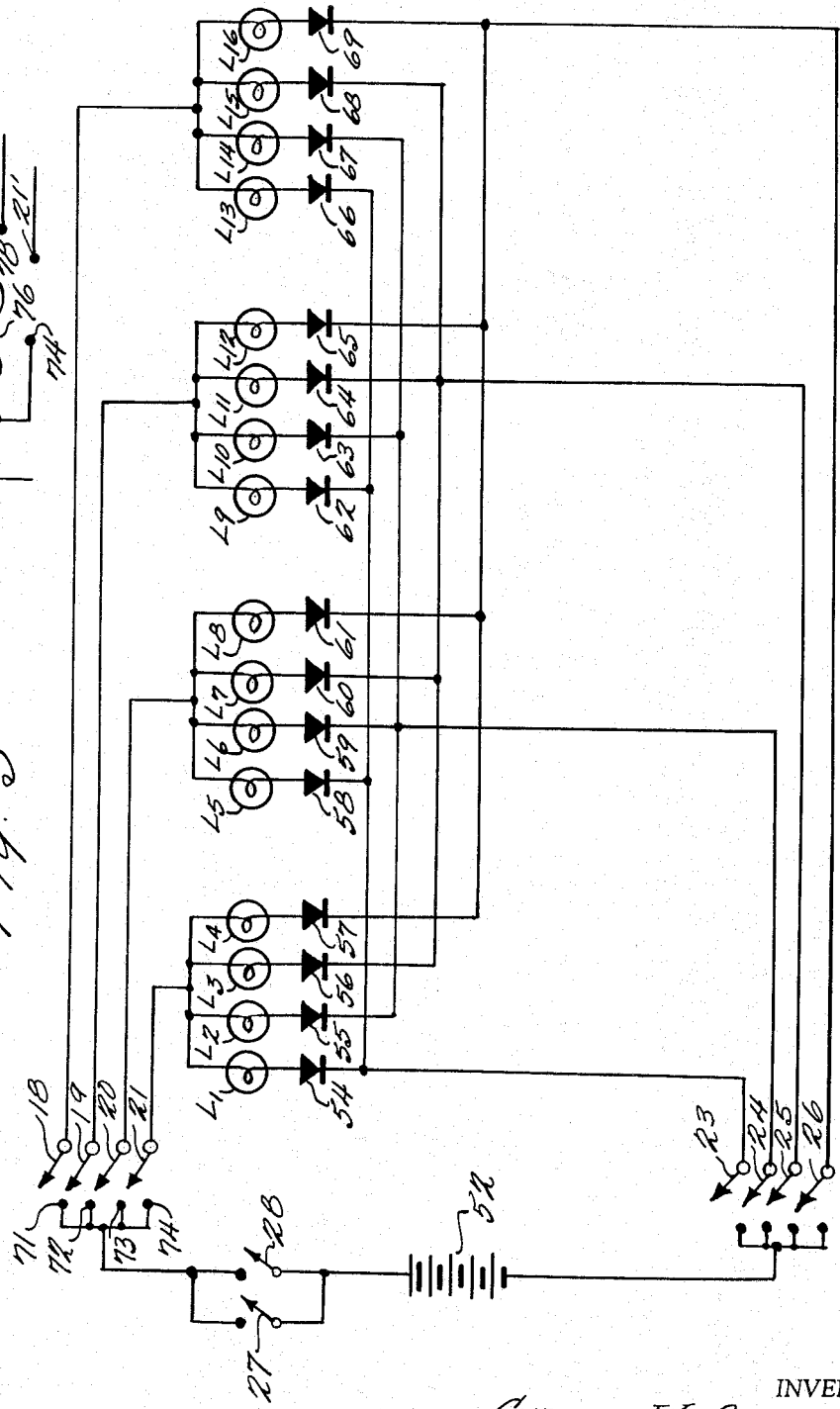

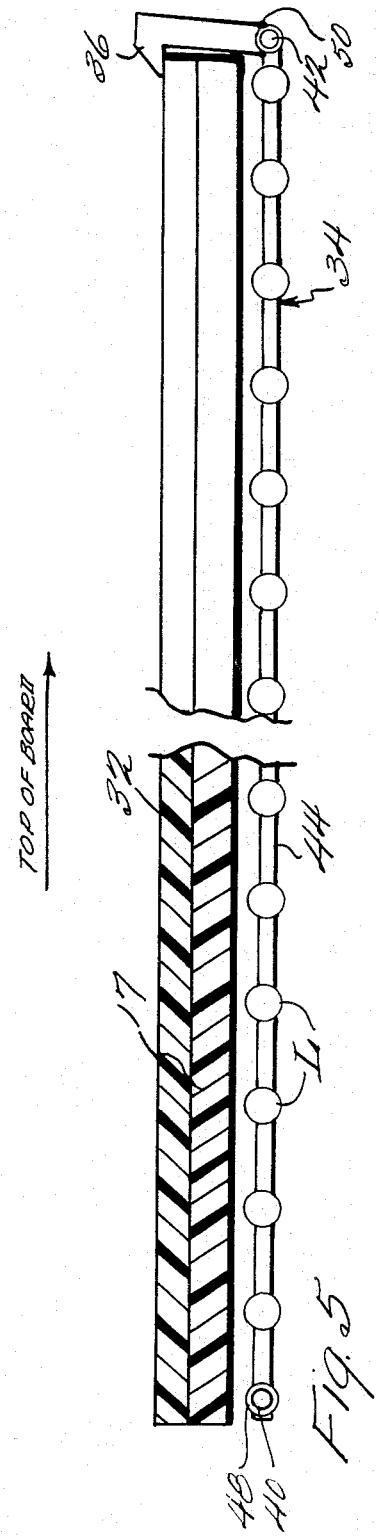
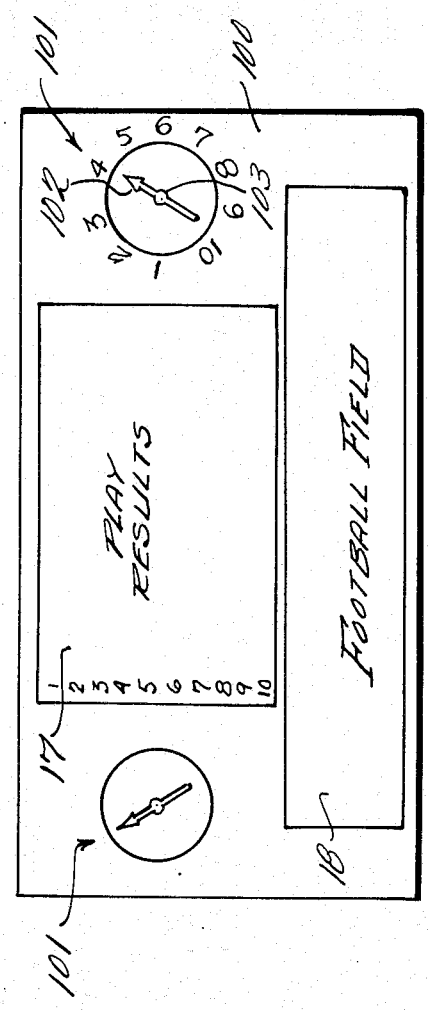

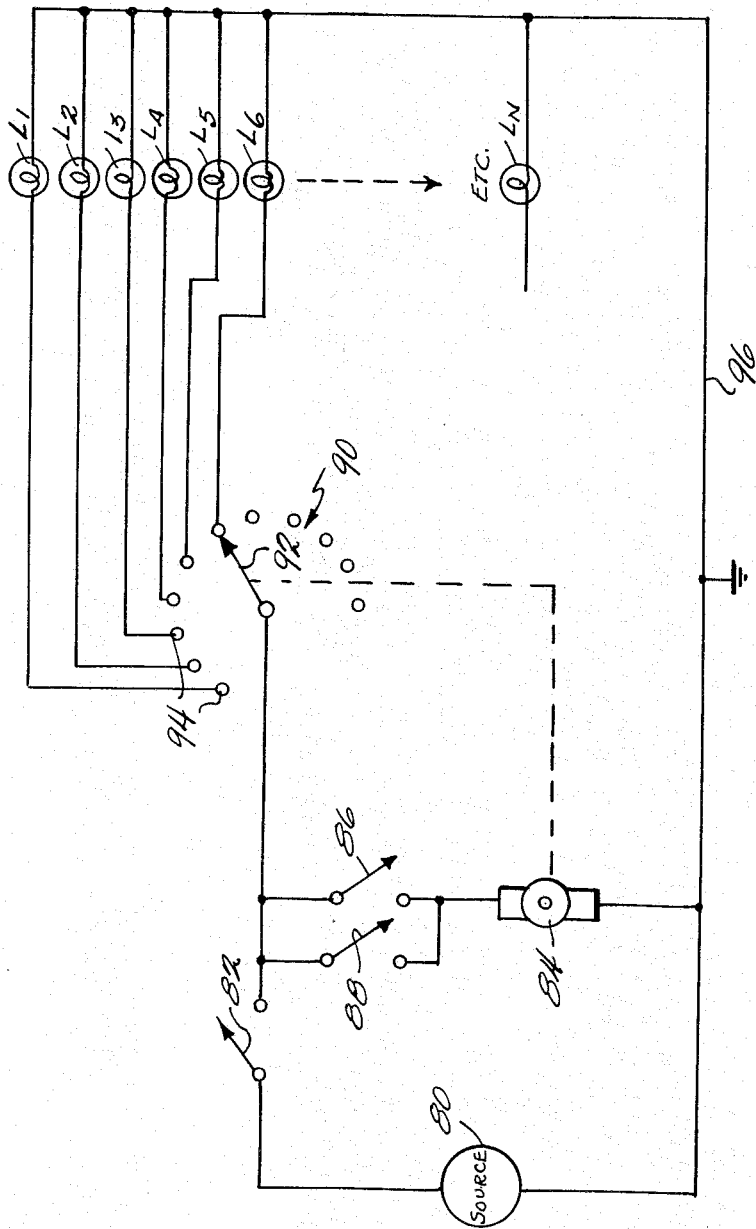

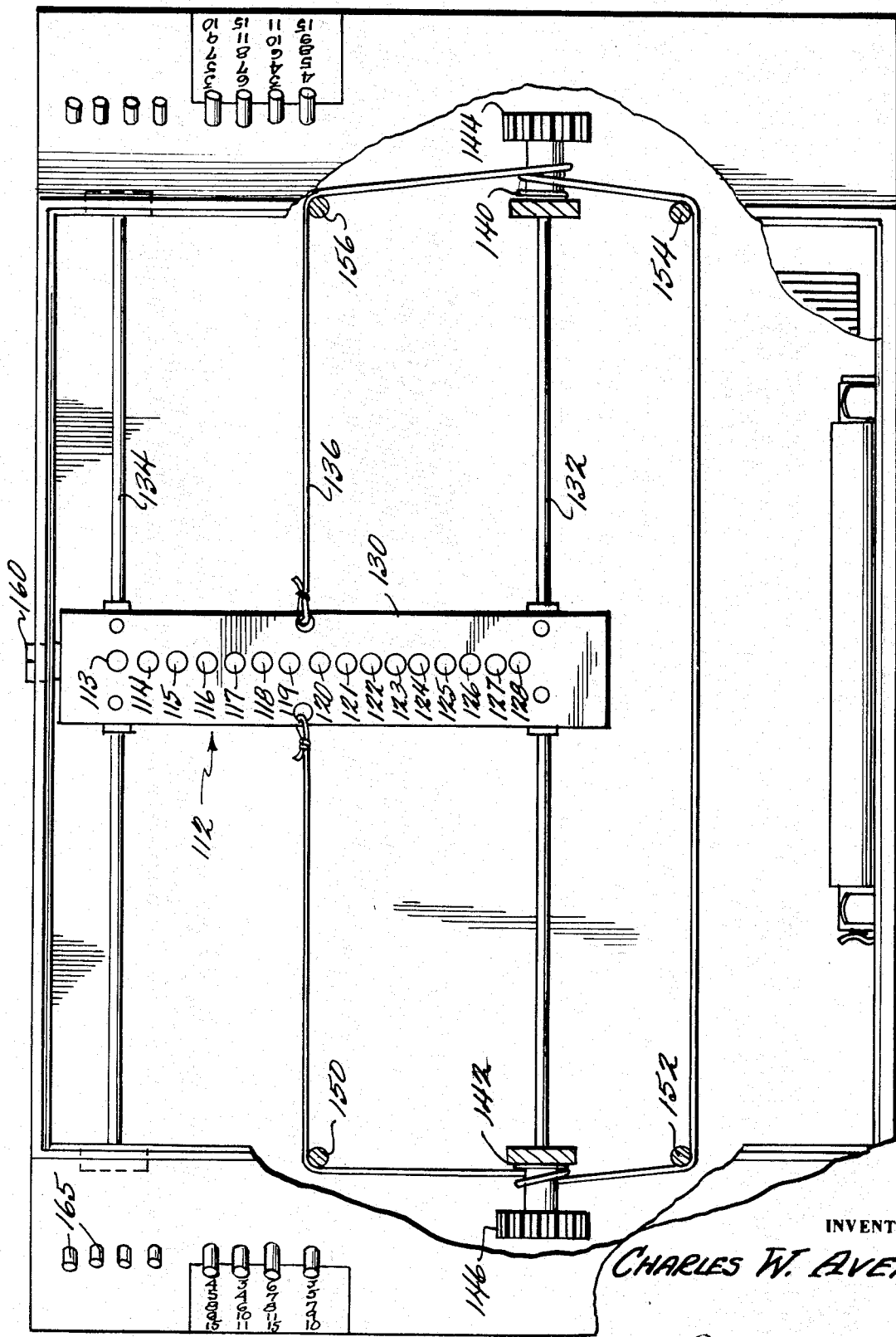

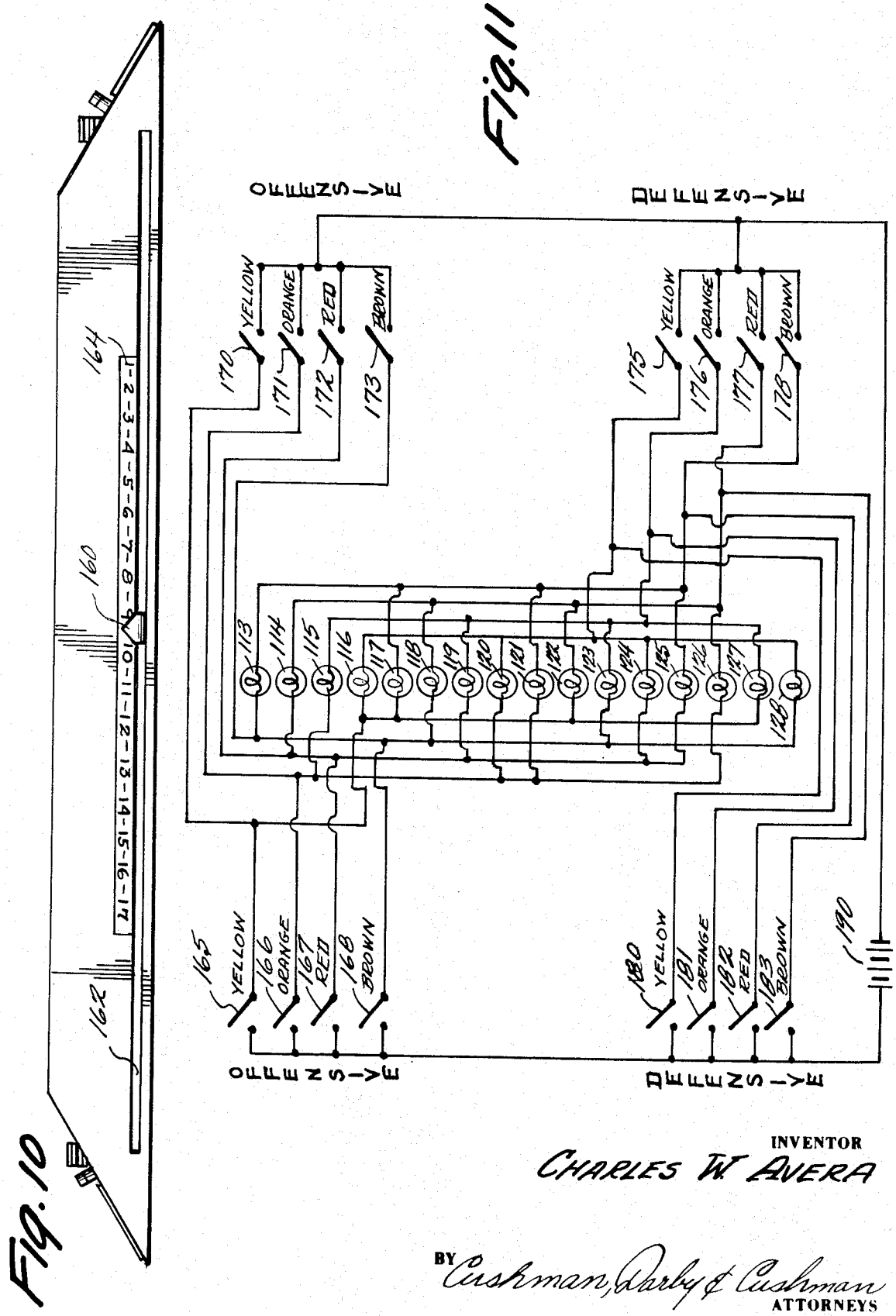

ELECTRICAL GAME

This application is a continuation-in-part of application Ser. No. 755,052, now abandoned filed Aug. 26, 1968, and a continuation-in-part of application Ser. No. 789,806, now abandoned filed Jan. 8, 1969.

The present invention relates to an athletic board game and more particularly to an electrical football game which utilizes play result selection means in cooperation with a plurality of indicator means to provide the results of specific football plays selected by the players of the game.

An object of the present invention is the provision of an athletic game that is easy to play and reliable in operation.

Another object is to provide an electrical game that enables the players to select from a plurality of athletic plays and to determine the results of the plays selected by the selection of actuation of one of a plurality of lightbulbs or other indicator means as arbitrarily determined by the actuation of play result selection means.

A further object of the invention is the provision of an athletic board game which prevents one player from controlling the play result opportunities afforded the second player by providing translucent means overlying grid means which represents the results of athletic plays to block the view of the various play results on said grid.

Still another object is to provide an electrical athletic board game which enables the direct reading of a play result from a play result grid means.

Yet another object of the present invention is the provision of a board game or training device which is inexpensive, easy to operate and reliable in operation.

Other objects and features of the invention will become apparent to those of ordinary skill in the art as the disclosure is made in the following description of preferred embodiments of the invention as illustrated in the accompanying sheet of drawings.

FIG. 1 is an illustration, partly cut away and partly in phantom, of the front side of one embodiment of the game;

FIG. 2 is a detailed representation of the grid portion shown generally in FIG. 1;

FIG. 3 is a schematic view of one electrical circuit which may be utilized to operate the game;

FIG. 4 shows an alternative embodiment for the play selector switches as illustrated in FIG. 3;

FIG. 5 shows a section of the device taken on the line 5—5 of FIG. 1 looking in the direction of the arrows;

FIG. 6 is a schematic view of an electrical circuit which may be utilized to operate the game;

FIG. 7 shows the front side of an alternative embodiment of the game;

FIG. 9 shows the embodiment of FIG. 8 with the top removed;

FIG. 10 shows a side view of the embodiment of FIG. 8; and

FIG. 11 shows a schematic of the circuit for the embodiment of FIG. 8.

Figure 8A:
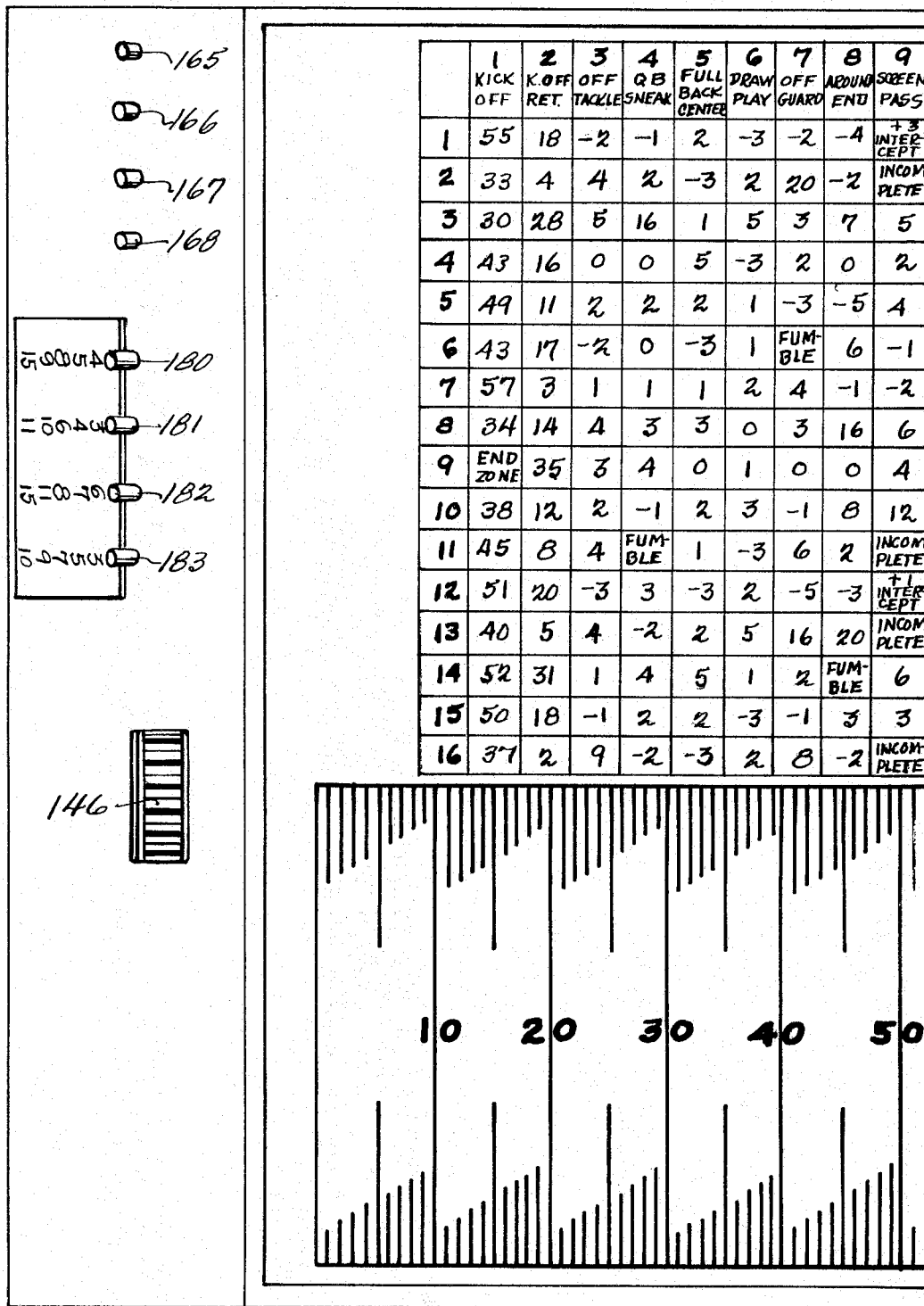
FIGS. 8A and 8B show a top view of a further embodiment of the invention.

With reference now to the drawings, wherein like reference characters designate like or corresponding parts throughout the several views, there is shown in FIG. 1 a general arrangement of the front of the game board wherein the game to be played is football, and in FIG. 2 there is shown the detailed arrangement of the grid 17. Located adjacent to the grid is the representation 18 of a football field. Although the game will be herein described with respect to football, it should be understood that this is merely representative and that the inventive concept herein disclosed is applicable to other games, such as basketball, baseball, soccer, etc., and to various types of training or teaching devices. Also located adjacent to the grid 17 is a first set of play result selection switches including the individual switches 18, 19, 20 and 21.

Located adjacent to the grid 17 and at the opposite side of the board from the switches 18–21 is a second set of play result selection switches including switches 23, 24, 25 and 26. In addition, two play initiation switches or enabling switches 27 and 28 are located adjacent to the grid 17 and on opposite sides thereof. The grid 17 is shown in more detail in FIG. 2 and includes a plurality of columns and rows, which form the grid, wherein the headings of the columns, or the column coordinates, include a plurlity of standard football plays, e.g., kick-off, draw play, screen pass, etc. The rows may be numbered from one to 16, as one example. The grid in this embodiment is comprised of a material 30 which is generally transparent to light, such as any well known transparent plastic material, while the play results located on the transparent member 30 are generally opaque to light.

With reference again to FIG. 1, a translucent layer of plastic or other suitable material 32 is placed in overlying relationship with respect to the grid 17. In this way, a blank field is all that can be seen by the players on the top surface of the grid. This, as will later be explained in more detail, improves the quality of the game and reduces the changes that one player may control by the selection of certain play result selection buttons and play result opportunities afforded the second player.

In addition, a bank of lights 34 (shown in phantom in FIG. 1) is movably oriented beneath the transparent grid 17 and the translucent layer 32 so that the bank can move in a lateral direction under the board or support means 100. The light bank 34 may also include a pointer 36 which may be used as a play selection indicator in cooperation with grid 17 by moving the light bank and the associated pointer 36 laterally along the board until the pointer and the light bank are oriented in aligned relationship with a chosen column of the grid which corresponds to the play selected. For example, with reference to FIG. 2, in conjunction with FIG. 1, the light bank 34 and pointer 36 may be moved laterally until the pointer is located above a selected play, such as "around end". Then upon energizing the circuitry of the device, as will later be explained, one of the lights in the light bank will be illuminated and will be positioned exactly under the play result in the "around end" column.

FIG. 5 illustrates in more detail one arrangement for the light bank 34 wherein rods 40 and 42 are rigidly attached to the support means or framework 100 of the game (not shown in FIG. 5) and wherein a slideable member 44 having lightbulbs or other indicator means 46 mounted thereon has apertures 48 and 50 which are adapted to have the rods 40 and 42 inserted therein so that the slideable member 44 is free to move laterally with respect to the grid 17.

With reference now to FIG. 3, there is shown one arrangement of electrical circuitry which may be utilized in the operation of the game. The circuit is powered by DC source 52, which is preferably a plurality of batteries connected in series with respect to one another. The source 52 is coupled to play initiation switches 27 and 28, which are normally open. These switches are coupled in electrical parallel with respect to each other and are connected to the first set of player result selection switches 18–21. Each of these switches is then coupled directly to respective first groups of lightbulbs. For example, the switch 21 is coupled to a first group of lightbulbs composed of bulbs $L_1$–$L_4$. The bulbs $L_1$–$L_{16}$ are coupled, respectively, to diodes 54–69, and the diodes and coupled to the second set of play result selection switches 23–26 so that only certain ones of the bulbs are in circuit relationship with certain ones of the switches 23–26. For example, the switch 23 is electrically coupled to a second group of lightbulbs $L_1$, $L_5$, $L_9$ and $L_{13}$. A similar arrangement is provided with respect to each of the remaining switches 24–26, so that each of the switches 23–26 is in circuit relationship with predetermined second groups of lightbulbs. The opposite sides of the switches 23–26 are then coupled directly to the source 52.

An alternative embodiment of the play result selection switches is illustrated in FIG. 4 wherein a knob 70, which may be weighted to enhance its ability to be manually spun and to remain spinning for a length of time, is oriented with respect to electrical terminals 18'–21', which correspond to the terminals associated with play result selection switches 18–21 in FIG. 3, and with the contacts 71–74 so that electrical contacts 78 and 78 associated with the knob 70 contact one of the terminals 71–74 and one of the terminals 18'–21' when the knob is in a stationary position. The contacts 76–78 as well as the terminals 18'–21' can readily be designed in such a manner that the probabilities are very small that the knob will stop between any one of the terminals 18'–21' so that electrical contact will always be made between one of the terminals 71–74 and one of the terminals 18'–21'.

In the operation of this embodiment of the invention, the light bank 34 and associated pointer 36 may be laterally moved so that the pointer is placed in the column heading which indicates the play selection desired. A ball indicator (not shown) is also provided to be moved along the football field 18 so as to indicate the position of the ball on the field. Similarly, a yards-to-go indicator (not shown) is placed on the field 18 to show when a first down is made, and it is moved each time a first down is obtained. To start the game, for example, one of the players must kick-off. This is done in the following manner. The light bank 34 and associated pointer 36 are laterally moved until the pointer 36 is placed at the top of the kick-off column, and the ball indicator is placed on the offensive player's 40 yard line on the field 18. The defensive player (the one who is to receive the kick-off) then depresses any one of his play result selection switches 23–26, if he is located at that side of the board. The selection of one of these switches is arbitrary so that the defensive player depresses any one of these buttons as he may desire. The opposing player (the player kicking off) must also depress one of his switches 18–21, in the first set of play result selection switches. Again, his choice is also arbitrary. In addition to depressing one of the switches 18–21, the offensive player must depress his respective play initiation switch, which is switch 27 in this example where the offensive player is located on the left-hand side of the board. This, of course, is an arbitrary procedure since the defensive player could depress his play initiation switch 28 in addition to or instead of the offensive player depressing his switch 27.

With reference now to FIG. 3, if it is assumed for the purpose of illustration that the defensive player has depressed the switch 26 and the offensive player has depressed switch 21, in addition to depressing switch 27, it can be seen that only bulb $L_4$ will be lighted while all the others will remain unlighted. With reference again to FIGS. 1 and 2, it can be seen that the lighting of bulb $L_4$ directly indicates a specific play result on the grid 17. Since the light bank 34 has been positioned in alignment with the kick-off column on the grid the lighting of light $L_4$ directly illuminates the play result in row 4 of the kick-off column so that the play result is a 43 yard kick-off, as seen in FIG. 2, since the lightbulbs $L_1$–$L_{16}$ are arranged to coincide with rows 1–16 on the grid, respectively. The ball indicator should then be placed on the 17 yard line of the defensive player.

At this point, of course, the kick-off must be returned, and the defensive player now becomes the offensive player. In order to return the kick-off, the light bank 34 and the associated pointer 36 must be moved to be aligned with the kick-off return column. The defensive player, now situated at the left hand side of the board will arbitrarily depress one of the play result selection switches 18–21 while the offensive player, now located at the righthand side of the board, will arbitrarily depress one of his play result selection switches 23–26 in addition to depressing his play initiation switch 28. If, for example, the defensive player depresses his switch 19 while the offensive player depresses his switch 25, in addition to depressing his play initiation switch 28, it can be seen from FIG. 3 that only lightbulb $L_{11}$ will be lighted. The result of this will be that the play result located in the kick-off return column and in row 11 of the grid will be illuminated to indicate that the kick-off return has netted a total of 8 yards. Again, this can best be seen by referring to FIG. 2. At this point, the ball indicator (not shown) should be moved from the offensive player's 17-yard line to his own 25-yard line.

Experience has shown that if the grid 17 and the play results located thereon are continually visible to the players, the players may soon realize that they can control by the selection of certain of their play result selection switches the play result opportunities afforded the other player. For example, it may become apparent to the alert player after some experience with the game that by closing his play result selection switch 18 the play result opportunities afforded the other player are limited to the play results associated with lightbulbs $L_{13}$–$L_{16}$ since no matter which of the play result selection switches 23–26 the opposing player chooses the play result opportunities have been significantly narrowed by the depression of switch 18. In order to overcome this and in order to improve the quality of the game and to reduce one player's chances of controlling by the selection of his play result selection switches the opportunities afforded to the second player, the grid 17 has been made transparent with the play results located thereon being opaque. In addition, a translucent layer 32 has been placed in overlying relationship with respect to that portion of the grid 17 which includes the play results. In this way, the more desirable play results located in each play column are not observable by the players so that it will make little or no difference to them which of their play result selection switches are depressed. Therefore, whereas without the translucent layer 32 a player selecting a long pass could depress play result selection switch 19 in the hopes that light $L_{11}$ would be lighted and a touchdown would be scoored, the presence of the translucent layer 32 prevents the player from seeing that a touchdown play result is available in row 11 of the long pass, so that his choice of a play result selection switch will be purely arbitrary and will not be guided by the knowledge that he can narrow the area of play results down so that a touchdown result may be possible. The operation of this embodiment of the invention is basically the same if the spinning knob illustrated in FIG. 4 is substituted for the play result selection switches 18–21 in FIG. 3. Although not shown, it should be understood that a similar spinning knob would be substituted for the play result selection switches 23–26. In using this embodiment, the offensive player again must depress his play initiations switch 27 and 28 and then must spin the knob 70 which will ultimately come to rest so as to connect one of the terminals 71–74 with one of the terminals 18'–21'.

The game is conducted following basic football rules with four downs necessary to obtain additional first downs. Various other rules may be provided which are not critical to the successful operation of the game. For example, the length of a game may be determined by providing 16 downs in each quarter and by counting only plays from scrimmage as downs. It a punt or field goal attempt is blocked, the ball goes over to the defender at the same spot where the ball was placed on the line of scrimmage. Field goals may be considered good if the yardage obtained is sufficient to get the ball to the goal line. In addition, each "pass intercepted" block on the play result grid has a plus yardage figure which means that the ball is moved against the defender by the indicated yardage at which point the play selection indicator 36 is moved to the "interception runback" column and the player attempting the runback goes on the offensive. The required buttons are pushed and the ball is moved the indicated yardage after which it becomes first down and 10 yards to go for the intercepting team. In the event of a fumble, the play selector indicator 36 is moved to the "fumble" column and the player with the ball pushes his offensive switch combination while the defender pushes one of his play result selection switches to see if the fumble is "recovered" or "lost". If the result is "lost", the defender takes over at the line of scrimmage, and if the result is "recovered" the offensive player loses the down and continues play as before.

With reference now to FIG. 6 there is shown another embodiment of electrical circuitry which may be utilized in the operation of the game. An AC or DC source of electrical power 80 is placed with one side connected to on-off switch 82. An appropriate AC or DC drive motor 84 is connected to the opposite side of source 80 and play result selector switches 86 and 88 are connected in parallel with each other and between the on-off switch 82 and drive motor 84. Although two such play result selector switches 86 and 88 are illustrated, it should be understood that only one such switch need be used. However, it may be desirable to utilize the two switches so that one can be placed at each side of the board much the same as the play result selector switches 18–21 and 23–26, respectively, are located on the board. A multiple contact or rotary switch assembly 90 has a movable contact member 92 with one end thereof connected between on-off switch 82 and play result selection switches 86–88. The rotary switch 90 also includes a pluality of stationary electrical terminals 94, each of which is directly connected to a respective one of the indicator means or lights $L_1-L_n$ wherein the number of indicator means or light may be varied according to the number of stationary contacts located in the rotary switch assembly and depending upon the number of rows desired on the grid 17 under each column headed by a particular athletic play. The opposite sides of each of the lights $L_1-L_n$ is coupled to the common line 96.

In the operation of the game utilizing this circuit, the circuit is initially energized from its power source 80 by closing the on-off switch 82. Although not shown, another on-off switch may be coupled in parallel with respect to the switch 82 so that each of the switches may be located at opposite ends of the playing board and be easily accessible to each of the players. As previously described, a play selector indicator which may be the pointer 36 associated with the movable light bank 34 or which may be any movable piece (not shown) that will effectively fit within each column heading to indicate the play selected, is placed in the column heading to indicate the play selection. The on-off switch 82 is then closed at the same time that one of the play selector switches 86 or 88 is closed so that the drive motor 84 is energized. The energization of the motor causes the movable contact on armature 92 of the rotary switch assembly to rotate in sequential electrical contact with each of the stationary terminals 94, and as the movable contact rotates it causes the lights $L_1-N_n$ to light as the armature passes the appropriate terminal 94 which is associated with each of the respective lights. The lights $L_1-L_n$ may be connected to the contacts 94 so as to cause either sequential flashing of the lights or random flashing thereof by simply altering the connections of the lights to the terminals 94 as desired.

When the player releases his respective play result selector switch 86 or 88, the drive motor is de-energized and the movable contact 92 stops so that only one of the lights will remain lighted. This light will then indicate the result of the play selected on the grid 17 in the manner hereinbefore described.

FIG. 7 illustrates another more simplified embodiment of the invention wherein the same basic grid 17 may be used with the athletic field representation 18 also being present on the board or support means 100. In addition, a spinner assembly 101 may be placed on the board adjacent to each of the player's positions. The spinner assembly may consist of a pointer 102 wherein is rotatably mounted on the support means or board 100 at the point 103. A plurality of indicia may be circumferentially located about the point of rotation of the pointer wherein the indicia correspond to indicia located on the grid 17 and wherein they identify the lateral rows of the grid. The number of indicia located around the circumference of the pointer, of course, is variable and would depend upon the number of choices or possibilities for play results offered on the grid 17.

In operating this embodiment of the invention, the offensive player merely manually spins the appropriate spinner 102 until it comes to rest to point to a particular indicia which indicates the appropriate row on the grid in which the play result is located. Since the column would have already been established by the selection of the play, the play result may be readily established by use of the coordinates on the grid by finding the intersection of the play column with the row selected by the pointer 102.

This invention thus provides for a unique game wherein the results of various athletic plays are determined by the depressing of various play initiation switches and play result selection switches by the offensive and defensive players. The invention also provides for a completely manual game.

Figure 8B:
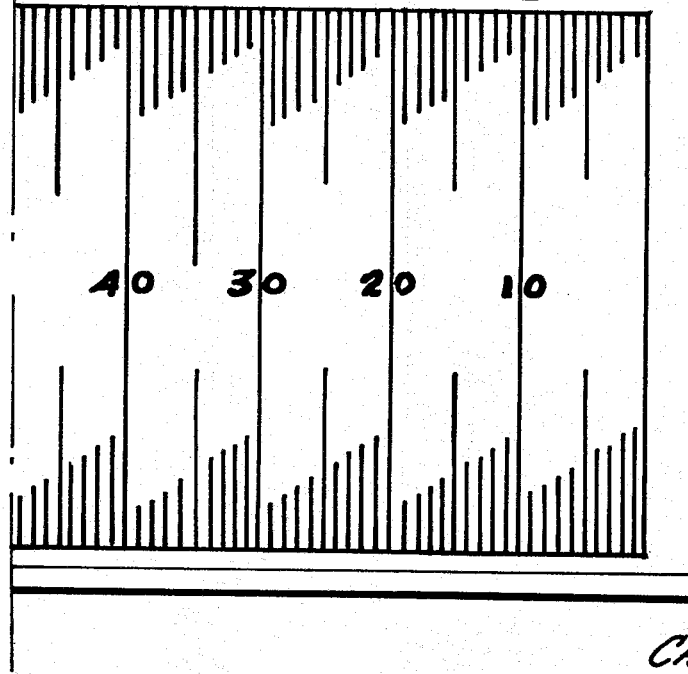

Reference is now made to FIGS. 8A and 8B which fit together as indicated to illustrate a top view of a further embodiment of this invention. In this embodiment, as in the embodiment of FIG. 1, a representation of a football field is formed on a sheet 110 of translucent material, such as an appropriate plastic, which rests atop housing 111. Adjacent the field is a grid like that shown in FIG. 1 with a plurality of alternative plays in columns and a plurality of results to those acts in rows so that for each play there are a number of possible results. However, in contrast to the above mentioned embodiment, each of the possible results remains at all times in full view of the players.

Also, as in the above embodiment, a light bar 112 comprised of 16 individual bulbs 113–128 is mounted on a frame 130 for movement beneath the grid on sheet 110 as shown in FIG. 9. As in FIG. 5, frame 130 is slidably mounted on rods 132 and 134 and connected to the ends of string or wire 136 as shown. String 136 is also looped once about knobs 140 and 142 which are connected for rotation together by rod 132 and have knurled ends 144 and 146 respectively which extend outside housing 111 for manual rotation by the players. String 136 also passes about posts 150, 152, 154 and 156 so that, when either knob 140 or 142 is manually rotated, light bar 112 moves along rods 132 and 134.

As can be seen in FIG. 10, light bar 112 has an indicator 160 which extends outside frame 111 through a slot 162 which runs along the side of housing 11. Indicia 164 also extend along the side of housing 111 so that indicator 160 indicates the column beneath which light bar 112 is currently located. Since indicia 164 cannot be ordinarily seen by a defensive player watching the sheet 110 and since the position of light bar 112 can be seen through translucent sheet 110, the offensive player can choose any of the possible plays without indicating his choice of the defensive players.

After choosing the play, the offensive player randomly depresses one of his four offensive buttons 165–168 or 170–173. Since the average result from any of the four buttons is roughly the same, there is no advantage in memorizing the possible results which can follow depressing any of the four buttons 165–168 or 170–173.

Next, the defensive player chooses and depresses one of his four buttons 175–178 or 180–183. However, unlike the offensive plays his choice of button is not random, but is based on which play or type of play he believes the offensive player to have chosen. Each of the buttons 175–178 and 180–183 has associated with it results which are most advantageous to the defense and, accordingly, disadvantageous to the offense. The plays against which each button is most effective are listed adjacent that button so that buttons 178 and 180 are good for plays 4, 5, 8, 9 and 15, buttons 181 and 177 for plays 3, 4, 6, 10 and 11, etc.

Referring to the schematic shown in FIG. 11, depressing one of the offensive buttons 165–168 or 170–173 and one of the defensive buttons 175–178 or 180–183 completes a current path from DC source 190 through one and only one of the bulbs 113–128 which lights and illuminates one of the result squares in the column of the grid above bar 112 and thus indicates the result of the chosen play. Each offensive button is connected to an offensive button at the opposite end of housing 111 and similarly each defensive button is connected to a defensive button at the opposite end, thus simplifying wiring considerably and causing no difficulty since offensive and defensive buttons on the same end will not normally ever be depressed simultaneously.

Thus, as in the embodiment shown in FIG. 3, each offensive button is connected to four different bulbs as is each defensive button. Further, since each of the defensive buttons connects to only one of the bulbs to which each offensive button connects, depressing an offensive button at one end of housing 111 and a defensive button at the other end lights one and only one bulb.

The play proceeds under normal football rules with kick offs, returns, punts, field goals and extra points being determined by moving the light bar beneath the appropriate column and then depressing the offensive and defensive buttons as described above. An indicator for showing the positions of the ball on the football field and an indicator for denoting first down yardage are preferably provided for keeping track of position on the field.

Further, sheet 111 is preferably removable so that other sheets representing results for other sports such as golf, baseball, basketball, sailing, finance, and hockey, together with appropriate playing fields or other indicia can be substituted.

Many other changes and modifications can be made in the above embodiments of the invention without departing from the scope of that invention and, accordingly, that scope is intended to be limited only by the scope of the appended claims.

What is claimed is:

1. A game comprising:

support means, grid means mounted on said support means for representing a plurality of results of a plurality of acts on an athletic playing area and having a plurality of result areas each having indicia disclosing a result, the location of each said result area being defined by a first coordinate representing one of a plurality of alternative acts and by a second coordinate representing one of a plurality of alternative results to said one act, a plurality of light sources including a plurality of bulbs, means mounting all of said bulbs in a straight line beneath said grid means, said mounting means being movably oriented beneath said grid means so that said mounting means and said sources are selectively movable along a path such that said sources pass beneath each of said result areas having said second coordinate so that an act can be chosen by moving all of said light producing sources beneath the result areas having the first coordinate representing that act, said mounting means including a frame for holding said bulbs, first and second substantially parallel fixed rods attached to said frame so that said frame can move along said rods with each bulb moving along a path roughly beneath said grid such that the result areas beneath which each said bulb move have the same second coordinate, first and second knobs connected to opposite ends of one of said rods for rotating that rod and each extending out of said housing for manual rotation, and a cord connected at both ends to opposite sides of said frame and looped about each of said knobs so that rotation of either of said knobs causes said frame to move along said robs, and play result selection means connected to said plurality of light sources for causing, in response to manual operation, one of said light sources to produce light and cause the result area above it to appear different from the other result area so that the indicia on that result area indicate the result of the chosen art.

2. A game as in claim 1 wherein said acts are football plays and said athletic playing area is a football field.

3. A game as in claim 2 further including means mounted on said support means for representing said football field.

4. A game as in claim 1 wherein said grid means is generally transparent to light and said indicia are generally opaque to light.

5. A game as in claim 1 including means for indicating the position of said mounting means and hence the act chosen.

6. A game as in claim 1 further including indicator means attached to said light source for movement with said light source and extending out of said housing for indicating the chosen act.

7. A game as in claim 6 wherein said housing has a slot running along a side thereof and said indicator means extends through said slot so that said indicator means is not normally visible to the players operating said play result selection means.

8. A game as in claim 1 wherein said play result selection means includes a D.C. source, a first group of switches connected to said source, a second group of switches connected to said source, a third group of switches connected to said source, a fourth group of switches connected to said source, means connecting each switch of said first group to a different plurality of said light source so that each light source is connected to one of said switches of said first group, means connecting each switch of said second group to the same light sources as a corresponding switch in said first group, means connecting each switch of said third group to a plurality of different light sources so that each switch of said first group and each switch of said third group both connect to only one common light source and means connecting each switch of said fourth group to the same light source as a corresponding switch in said third group so that closing one of said switches in said first group and one of said switches in said third group or one of said switches in said second group and one of said switches in said fourth group completes a current path from said source through one, and only one, of said light sources.

* * * * *